(12) United States Patent
Saka et al.

(10) Patent No.: US 6,792,147 B1
(45) Date of Patent: Sep. 14, 2004

(54) OBJECT RECOGNITION SYSTEM

(75) Inventors: Masakazu Saka, Wako (JP); Hiromitsu Yuhara, Wako (JP); Tomoyoshi Aoki, Wako (JP); Morimichi Nishigaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 578 days.

(21) Appl. No.: 09/691,124

(22) Filed: Oct. 18, 2000

(30) Foreign Application Priority Data

Nov. 4, 1999 (JP) .......................................... 11-314331

(51) Int. Cl.$^7$ ................................................ G06K 9/48
(52) U.S. Cl. ........................ 382/199; 382/190; 382/291
(58) Field of Search ................................. 382/103, 104, 382/106, 151, 190, 199, 291; 340/933, 937, 903; 348/169

(56) References Cited

U.S. PATENT DOCUMENTS

| | | | | |
|---|---|---|---|---|
| 5,487,116 A | * | 1/1996 | Nakano et al. | 382/104 |
| 5,617,085 A | * | 4/1997 | Tsutsumi et al. | 340/903 |
| 5,892,855 A | * | 4/1999 | Kakinami et al. | 382/291 |
| 5,987,174 A | * | 11/1999 | Nakamura et al. | 382/199 |
| 6,005,492 A | * | 12/1999 | Tamura et al. | 340/937 |
| 6,191,704 B1 | * | 2/2001 | Takenaga et al. | 340/903 |

FOREIGN PATENT DOCUMENTS

| | | |
|---|---|---|
| JP | 7-25286 | 1/1995 |
| JP | 8-188104 | 7/1996 |
| JP | 2712809 | 2/1998 |
| JP | 10-97699 | 4/1998 |

* cited by examiner

*Primary Examiner*—Daniel Mariam
(74) *Attorney, Agent, or Firm*—Lahive & Cockfield, LLP; Anthony A. Laurentano, Esq.

(57) ABSTRACT

An object recognition system including a position sensor, an image sensor and a controller is provided. The position sensor determines the position of an object, and the image sensor captures an image of the object. The controller sets a processing area within the image captured by the image sensor based on the position of the object determined by the position sensor and a predetermined size for the object to be recognized. The controller extracts horizontal edges from the processing area, and judges whether each of the extracted edges belongs to the object based on characteristics of the object to be recognized. More practically, the controller can check if each of the extracted edges contains a pixel on a boundary of the processing area. If so, the controller judges to the edge to belong to an object other than the object. The controller can also examine the linearity of each of the extracted edges. If the linearity is larger than a predetermined value, the controller judges the edge to belong to an object other than the object. The controller can also examine the slope of each of the extracted edges. If the slope is larger than a predetermined value, the controller judges the edge to belong to an object other than the object. Thus, the edges judged to belong to an object other than the object are removed. The controller recognizes the outline of the object based on the edges judged to belong to the object.

26 Claims, 17 Drawing Sheets

Fig. 7

| -1 | -1 | -1 |
|----|----|----|
| 2  | 2  | 2  |
| -1 | -1 | -1 |

(a)

$$F(i,j) = \begin{array}{|c|c|c|} \hline F(-1,-1) & F(0,1-1) & F(1,-1) \\ \hline F(-1,0) & F(0,0) & F(1,0) \\ \hline F(-1,1) & F(0,+1) & F(1,1) \\ \hline \end{array}$$

(b)

Fig. 9
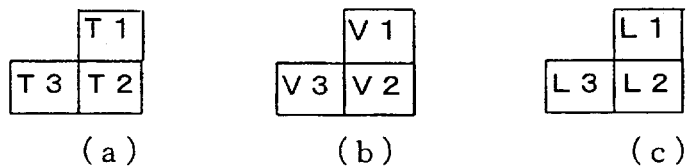
(a)  (b)  (c)
(d)
| | Conditions | Results | |
|---|---|---|---|
| | | Label L2 | Combined Labels |
| 1 | V1≠V2, V3≠V2 | L | |
| 2 | V1≠V2, V3=V2 | L3 | |
| 3 | V1=V2, V3≠V2 | L1 | |
| 4 | V1=V2, V3=V2, L1=L3 | L1 | |
| 5 | V1=V2, V3=V2, L1≠L3 | L1 | (L1, L3) |
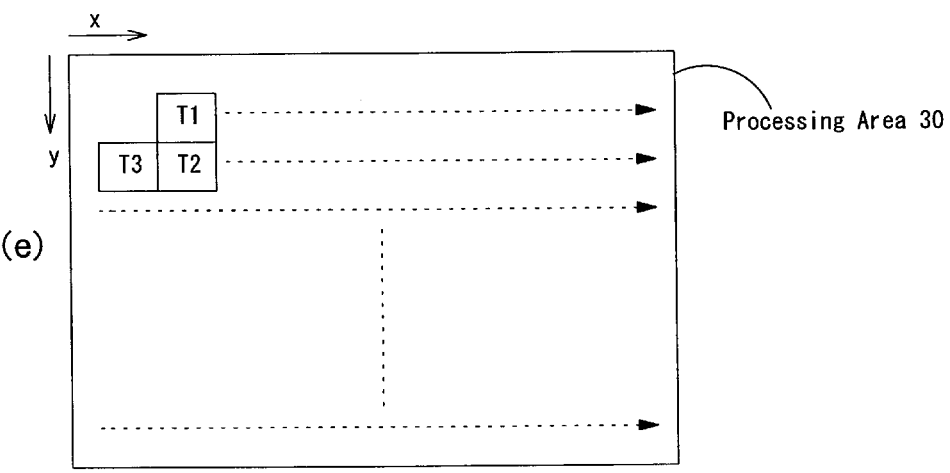
(e)

Fig. 10

| . | . | . | . | . | . | . | . | . | . | . | . | . |
|---|---|---|---|---|---|---|---|---|---|---|---|---|
| . | 1 | 1 | . | . | . | 1 | 1 | . | . | . | . | . |
| . | 1 | . | . | . | . | 1 | 1 | . | . | . | . | . |
| . | . | . | 1 | . | . | . | . | 1 | 1 | 1 | 1 | . |
| . | . | 1 | 1 | 1 | 1 | 1 | . | . | . | . | . | . |
| . | 1 | 1 | . | . | . | 1 | 1 | . | . | . | . | . |
| . | 1 | 1 | . | . | . | 1 | 1 | . | . | . | . | . |

(a)

| . | . | . | . | . | . | . | . | . | . | . | . | . |
|---|---|---|---|---|---|---|---|---|---|---|---|---|
| . | A | A | . | . | . | B | B | . | . | . | . | . |
| . | A | . | . | . | . | . | B | B | . | . | . | . |
| . | . | . | C | . | . | . | . | B | B | B | B | . |
| . | . | D | C | C | C | C | . | . | . | . | . | . |
| . | E | D | . | . | . | C | C | . | . | . | . | . |
| . | E | D | . | . | . | C | C | . | . | . | . | . |

93   92   91   (b)

| . | . | . | . | . | . | . | . | . | . | . | . | . |
|---|---|---|---|---|---|---|---|---|---|---|---|---|
| . | A | A | . | . | . | B | B | . | . | . | . | . |
| . | A | . | . | . | . | . | B | B | . | . | . | . |
| . | . | . | C | . | . | . | . | B | B | B | B | . |
| . | . | C | C | C | C | C | . | . | . | . | . | . |
| . | C | C | . | . | . | C | C | . | . | . | . | . |
| . | C | C | . | . | . | C | C | . | . | . | . | . |

| -1 | 2 | -1 |
|---|---|---|
| -1 | 2 | -1 |
| -1 | 2 | -1 |

Fig. 13
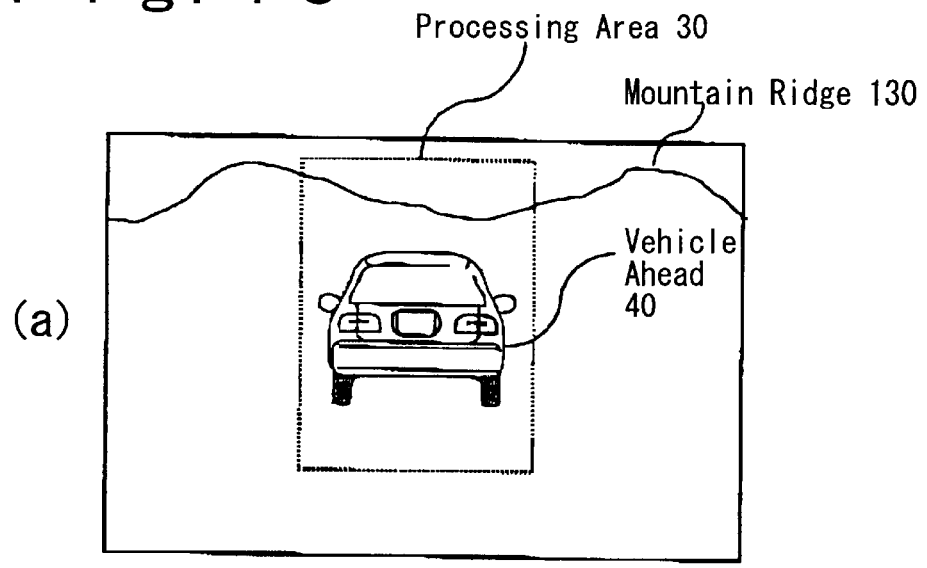
(a)
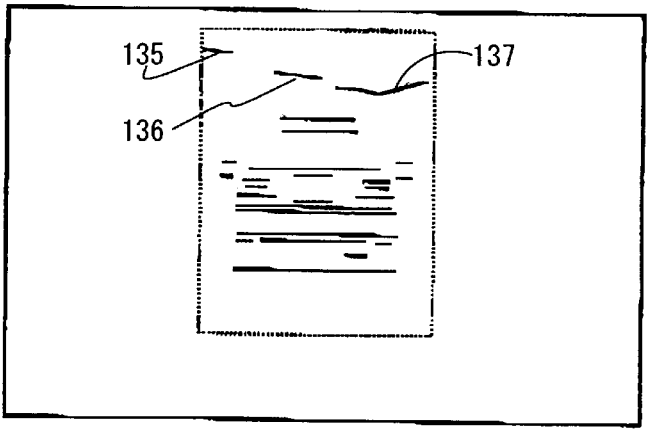
(b)
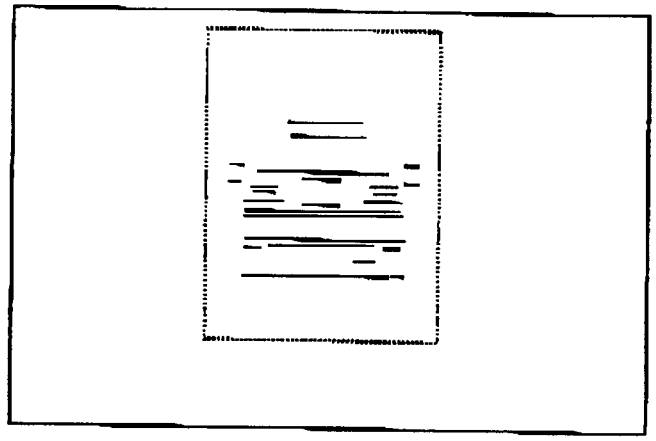
(c)

Fig. 14
(a) 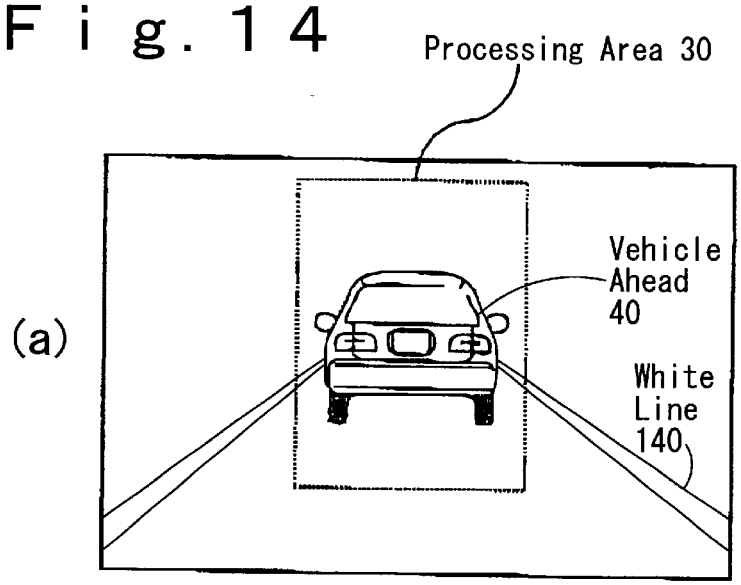
Processing Area 30
Vehicle Ahead 40
White Line 140
(b) 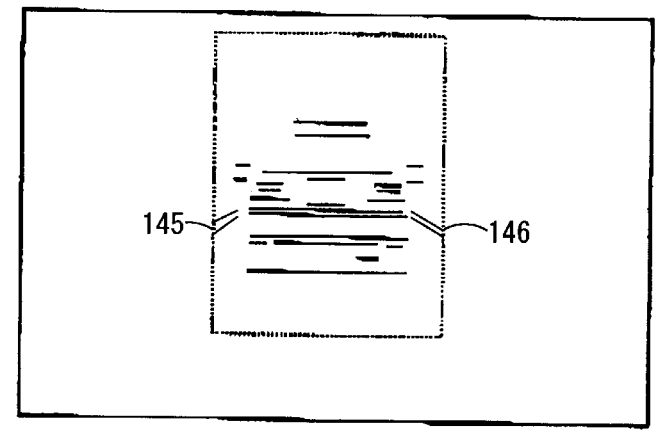
145, 146
(c) 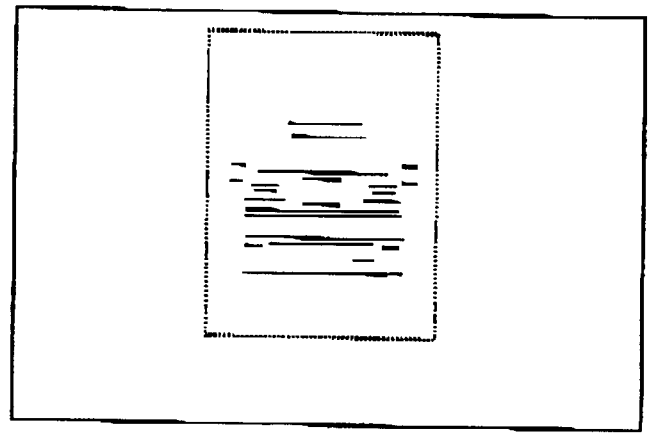

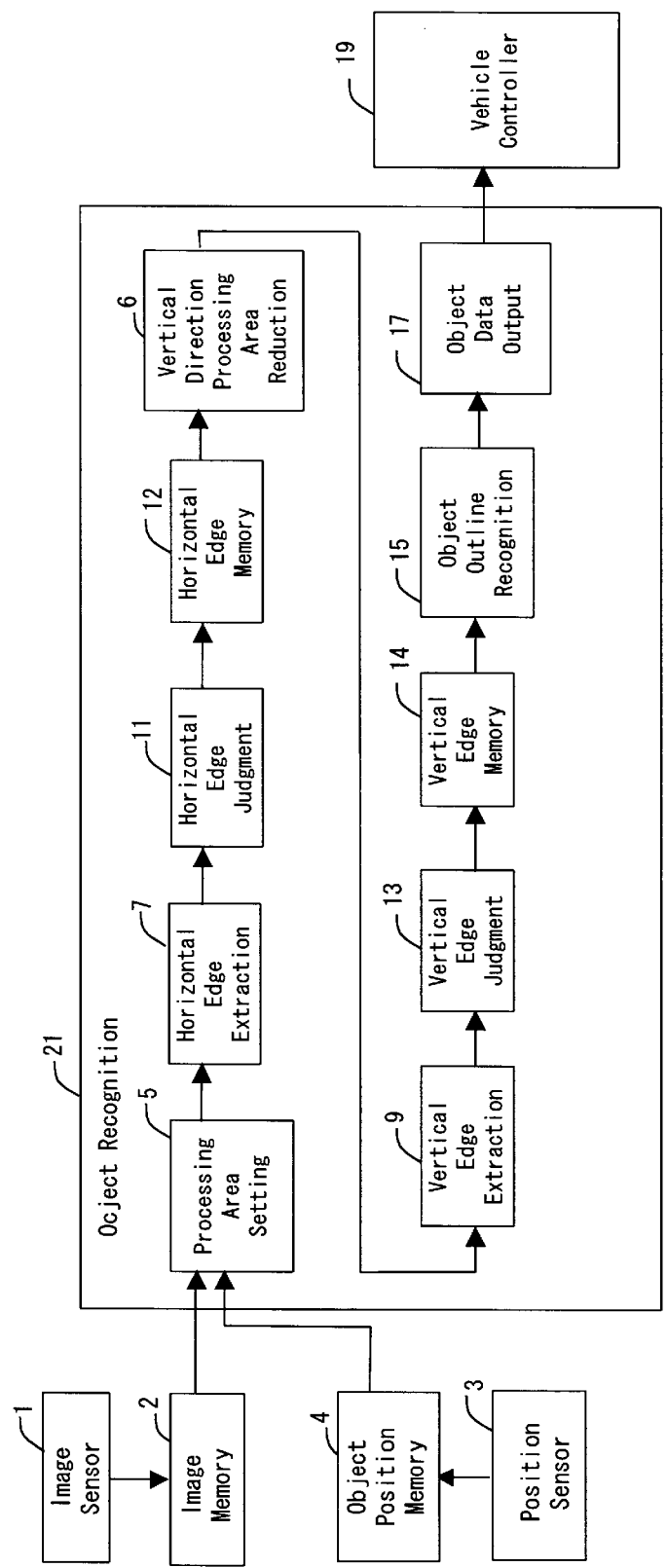

OBJECT RECOGNITION SYSTEM

FIELD OF THE INVENTION

The present invention relates to an object recognition system which is mounted on a vehicle and recognizes an object ahead of the vehicle, and more particularly to an object recognition system which is mounted on a vehicle and recognizes the outline of an object ahead of the vehicle.

BACKGROUND OF THE INVENTION

In recent years, devices which determine the distance and size of an object in front of a vehicle, and which appropriately control the vehicle in accordance with this determination, have been proposed for improving the safety of vehicle operation. A typical method for obtaining information about the object ahead includes the steps of: extracting horizontal edges and vertical edges from captured image; determining whether each of the extracted edges belongs to the object such as a vehicle ahead; and recognizing the object based on the edges determined to belong to the object.

Japanese Patent No. 2712809 describes an apparatus for detecting an obstacle. According to the apparatus, a threshold or the number of continuous points forming each of edges in both horizontal and vertical directions is set beforehand such that it has a larger value for a lower portion on the screen, based on the fact that an object at a shorter distance is displayed larger at a lower portion on the screen. The apparatus judges an area to belong to an obstacle when the number of continuous points forming each of the edges is larger than the threshold value.

Japanese Patent Application Kokai No. Hei 7-25286 describes a method for recognizing the vehicle ahead. According to the method, a certain vertical target area is set to calculate a sum of differentiated values of densities of the pixels in each column. A certain horizontal target area is also set to calculate a sum of differentiated values of densities of the pixels in each row. A Histogram for the vertical target area is created according to the sum differentiation values for columns while a histogram for the horizontal target area is created according to the sum differentiation values for rows. In the histogram for the vertical target area, the pixel columns whose sum differentiation values are greater than a predetermined value are chosen, thereby the left and right candidate ends of the vehicle ahead being determined. In the histogram for the horizontal target area, the pixel rows whose sum differentiation values are greater than a predetermined value are chosen, thereby the upper and lower candidate ends of the vehicle ahead being determined. The amount of shift between the current coordinate and the coordinate after a period of time for each candidate point is computed. A candidate end whose amount of shift computed is less than a threshold, and which has the minimum amount of shift among all the candidate ends is determined as one of the points forming the outline of the vehicle ahead.

Japanese Patent Application Kokai No. Hei 10-97699 describes a device for determining whether or not an object exists. The device recognizes left and right guidelines such as white lines in the captured image, and extracts horizontal edges from an area between the left and right guidelines. A probable area in which an obstacle may exist is estimated based on the extracted horizontal edges. Vertical edges are then extracted in the probable area. The device judges that no object exists if the number of vertical edges whose lengths exceed a predetermined value is less than two.

However, according to Japanese Patent No. 2712809, Japanese Patent Application Kokai No. Hei 7-25286 and No. Hei 8-188104, when there are, for example, natural objects, a building, a road sign, etc. having longer edges than an object to be recognized, their edges may cause errors in object recognition. According to Japanese Patent Application Kokai No. Hei 10-97699, although a processing area is restricted by the left and right guide lines, the width of an object may be erroneously recognized due to edges of an artificial object such as a road sign, an electric light pole, a guardrail, etc. provided closest to the guide lines.

Accordingly, one object of the invention is to provide a system capable of recognizing the outline of an object from horizontal edges and/or vertical edges even if undesired edges exist in the image.

SUMMARY OF THE INVENTION

According to one aspect of the invention, an object recognition system including a position sensor, an image sensor, and a controller is provided. The position sensor determines the position of an object, and the image sensor captures an image of the object. The position sensor can be implemented with radar or a pair of image sensors. The controller sets a processing area within the image captured by the image sensor based on the position of the object determined by the position sensor and a predetermined size for the object to be recognized. It is preferable that the predetermined size is set to surround the object to be recognized.

The controller extracts edges from the processing area. Extraction of edges can be carried out by detecting a variation of intensity values of pixels contained in the processing area. The controller then judges whether each of the extracted edges belongs to the object based on characteristics of the object to be recognized.

According to one aspect of the invention, the above judgment includes checking if each of the extracted edges contains a pixel located on a boundary of the processing area. If so, the controller judges that the edge belongs to an object other than the object to be recognized.

According to another aspect of the invention, the above judgment includes examining a linearity of each of the extracted edges. If the edge has a poor linearity, then the controller judges that the edge belongs an object other than the object to be recognized. The linearity of each of the extracted edges can be examined by calculating a variance of the positions in vertical direction of the points forming the edge. If the calculated variance is greater than a predetermined value, then the controller judges that the edge belongs an object other than the object to be recognized.

According to further aspect of the invention, the above judgment includes examining a slope of each of the extracted edges. If the slope is larger than a predetermined value, then the controller judges that the edge belongs to an object other than the object. The slope of each of the extracted edges can be examined by approximating the edge by straight lines and calculating the slope of the edge approximated by straight lines.

The edges typically include horizontal and vertical edges. Alternatively, the edges may include horizontal edges only. For the latter case, the object is recognized based on the horizontal edges judged to belong to the object.

The outline of the object can be recognized by determining upper, lower, left, and right ends of the object. Thus, the vehicle ahead traveling in front of the vehicle mounting the system of the invention can be recognized by the positions of the upper, lower, left, and right ends of the outline of the vehicle ahead.

According to one aspect of the invention, the controller determines the upper and lower ends from the horizontal edges, and determines the left and right ends from the vertical edges. More particularly, for the upper end, the controller identifies an upper horizontal edge whose length is larger than a predetermined value and which is closest to the upper boundary of the processing area. For the lower end, the controller also identifies a lower horizontal edge whose length is larger than the predetermined value and which is closest to the lower boundary of the processing area. The upper end of the object is determined by the position in the vertical direction that corresponds to the identified upper horizontal edge, and the lower end of the object is determined by the position in the vertical direction that corresponds to the identified lower horizontal edge. Furthermore, the controller identifies a left vertical edge whose length is larger than a predetermined value and which is located near the left boundary of the processing area. The controller also identifies a right vertical edge whose length is larger than the predetermined value and which is located near the right boundary of the processing area. The left end of the object is determined by the position in the horizontal direction that corresponds to the identified left vertical edge, and the right end of the object is determined by the position in the horizontal direction that corresponds to the identified right vertical edge.

According to another aspect of the invention, the controller reduces the processing area in the vertical direction to the area defined by the determined upper and lower ends. In this case, the vertical edges are extracted from the reduced process area.

The controller can comprise a micro-controller which typically includes a central unit (CPU), or a micro-processor, a read-only memory (ROM) containing control programs that when executed by the processor performs respective functions which are to be described hereafter. The controller also includes a random-access memory (RAM) that provides a working area for the CPU and temporary storage for various data and programs.

BRIEF DESCRIPTION OF THE DRAWINGS

FIG. 7(A) is a diagram showing the filter for extracting horizontal edges, and FIG. 7(B) is a diagram showing the coordinates of filter elements.

FIG. 9 is a diagram illustrating the template and method of determining labels used in accordance with one embodiment of the present invention.

FIG. 10 is a diagram illustrating labeling scheme in accordance with one embodiment of the present invention.

FIG. 11 is a diagram showing the filter for vertical edges.

FIG. 13 is a diagram showing the scheme for determining horizontal edges in accordance with one embodiment of the invention, and also illustrating one example of the horizontal edges having poor linearity.

FIG. 14 is a diagram showing the scheme for determining horizontal edges in accordance with one embodiment of the invention, and also illustrating one example of the horizontal edges having a large slope.

FIG. 18 is a block diagram illustrating the overall structure, and functional blocks of the controller of another embodiment of the present invention.

DESCRIPTION OF THE PREFERRED EMBODIMENTS

Figure 1:
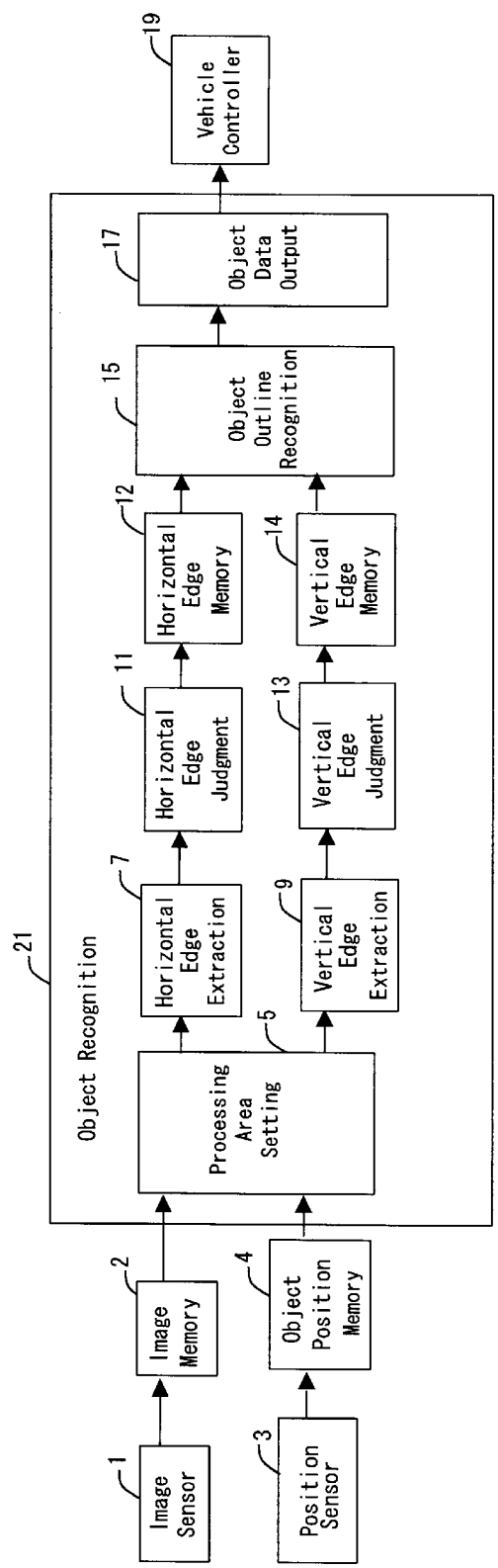
FIG. 1 is a block diagram illustrating the overall structure, and functional blocks of the controller of one embodiment of the present invention.

The embodiments of the present invention will be described below with reference to the attached drawings. FIG. 1 is an overall block diagram of an object recognition system in accordance with one embodiment of the present invention. Other than the image sensor 1 and the object position sensor 3, all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller.

In the present embodiment discussed below, it is assumed that an object to be recognized by the object recognition system is a vehicle ahead that traveling ahead of the vehicle mounting the system of the invention.

The image sensor 1 shown in FIG. 1 captures a view ahead of the vehicle mounting the system of the invention. The image sensor 1 is typically two-dimensional CCDs, and can be two-dimensional photo-sensor arrays. When usage in the night is considered, an image sensor using infrared light is advisable. In this case, it is preferable to install infrared-transparent filters in front of a lens, and to design the system such that the object is illuminated at a predetermined period from an infrared light source. The image sensor senses the infrared light reflected from the object. The image captured by the image sensor 1 is converted into digital data by an analog-to-digital converter (not shown), and is stored in an image memory 2.

An object position sensor 3 is typically implemented by laser radar or millimeter-wave radar. The position sensor 3 radiates laser or millimeter-wave to the object and receives the signal reflected by the object to measure the distance from the vehicle mounting the system of the invention to the object as well as the relative direction of the object to the vehicle. The position sensor may be a scan-type radar apparatus with a single beam for scanning over a certain angle range a head of the vehicle mounting the system of the invention. Alternatively, the scan-type radar with a plurality of beams may also be used. The angle range covered by beams of the radar is set based on the range in which the object to be recognized can be captured by the image sensor 1. In this embodiment, since the object to be recognized is the vehicle ahead, the radar is set to cover at least the lane of the vehicle mounting the system of the invention. Alternatively, the direction of the beams of the radar may be changed as appropriate according to the position of the vehicle ahead obtained in a previous recognition cycle such that the beams are correctly radiated to the vehicle ahead. Thus, the distance D and the direction θ of the vehicle ahead are determined and then stored in an object position memory 4 shown in FIG. 1.

Figure 2:
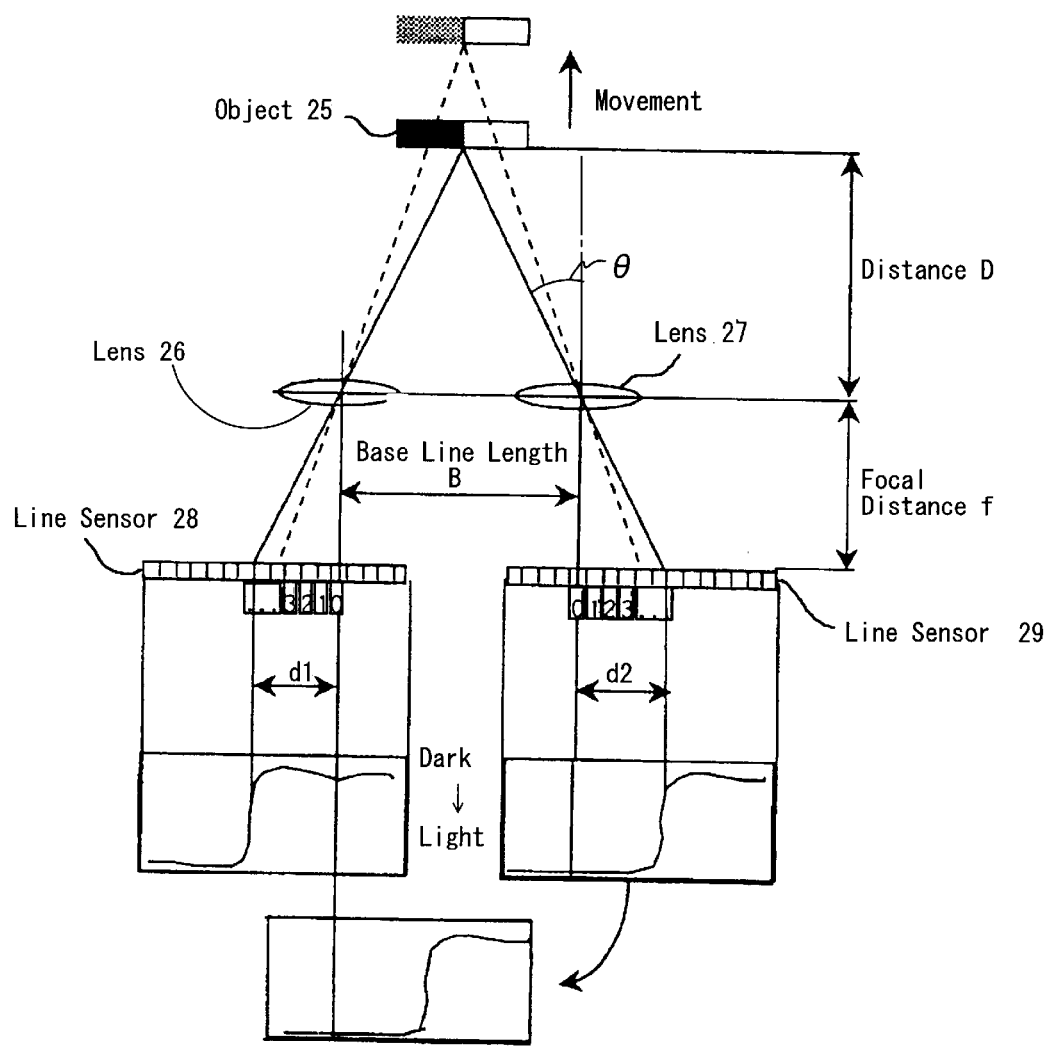
FIG. 2 is a diagram illustrating the principle of measurement by the triangulation method.

According to another embodiment, the position sensor 3 is implemented by using a pair of optical image sensors. By way of example, FIG. 2 shows the principle of measuring the distance by the triangulation method. For the sake of simplicity, the pair of image sensors shown in FIG. 2 are described as one-dimensional line sensors. A line sensor 28 and lens 26 constituting one of the pair of image sensors are arranged at a specified distance, i.e., at a distance equal to the base line length B in the horizontal direction from the line sensor 29 and lens 27 constituting the other of the pair.

The line sensors 28 and 29 are respectively positioned at the focal length f of the lenses 26 and 27. Assume that an image of an object 25 located at distance "D" from the plane of the lenses 26 and 27 is formed at a position shifted by a distance d1 from the optical axis of the lens 26 in the case of the line sensor 28, and is formed at a position shifted by a distance d2 from the optical axis of the lens 27 in the case of the line sensor 29. Then, according to the principle of triangulation, the distance "D" to the object 25 from the plane of the lenses 26 and 27 is determined by the equation:

$$D = B \cdot f / (d1 + d2).$$

In the embodiment, the images are digitized. Accordingly, the distance (d1+d2) is digitally calculated. The sum of the absolute values of the differences between the digital values indicating the intensities of the corresponding pixels of both images obtained from the line sensors 28 and 29 is determined while one or both of said images are shifted, and this sum is taken as a correlation value. The amount of shift of the images when this correlation value is at a minimum indicates the positional deviation between the two images, i.e., (d1+d2). In idealized terms, the distance by which the two images obtained from the line sensors 28 and 29 must be moved in order to cause said images to overlap as shown in FIG. 2 is (d1+d2). The direction θ of the object 25 to the vehicle mounting the system of the invention can be determined by the equation, tan θ=d2/f with respect to the optical axis of the lens 27.

In one embodiment, the captured image is divided into a plurality of windows and the above determination of the distance is carried out for each of windows. The determined distance is compared with a distance to the road that is calculated and stored beforehand for each window. If the determined distance is shorter than the distance to the road, the determined distance is judged to be the distance to the object. Thus, by determining the distances of the windows that correspond to the lane area of the vehicle mounting the system of the invention with a steering angle of the vehicle taken into account, the distance to the vehicle ahead may be calculated.

In another embodiment, the position sensor 3 is implemented by using the radar and the pair of image sensors in combination. By the way of example, in the situation in which it is difficult to determine the distance and the direction using the image captured by the pair of image sensors (for example, when the vehicle ahead is faraway from the vehicle mounting the system of the invention, or when the vehicle ahead is running through a tunnel and a view ahead of the vehicle cannot be stably captured), the radar is used to determine the distance and direction. On the other hand, using the radar to determine the distance and the direction limits the angle range of the vehicle mounting the system of the invention to a predetermined range. In other words, with the radar, it is difficult to cover a wide range that can be covered by the image sensors. Therefore, preferably, the direction of the beams of the radar is changed according to the direction of the vehicle ahead determined by the image sensors.

An object recognition part 21 shown in FIG. 1 sets a processing area within the image captured by the image sensor 1, and recognizes the vehicle ahead using edges extracted from the processing area. The process of recognizing the object may be repeatedly executed at predetermined time intervals (for example, 100 milliseconds). Described below in detail is the method for recognizing the object implemented by the object recognition part 21.

Setting Processing Area

A processing area setting part 5 shown in FIG. 1 sets a processing area within the image captured and stored in the image memory 2 based on the position of the object stored in the object position memory 4 and a predetermined size for the object to be recognized. The predetermined size for the object to be recognized is set beforehand to surround the object to be recognized.

Figure 3:
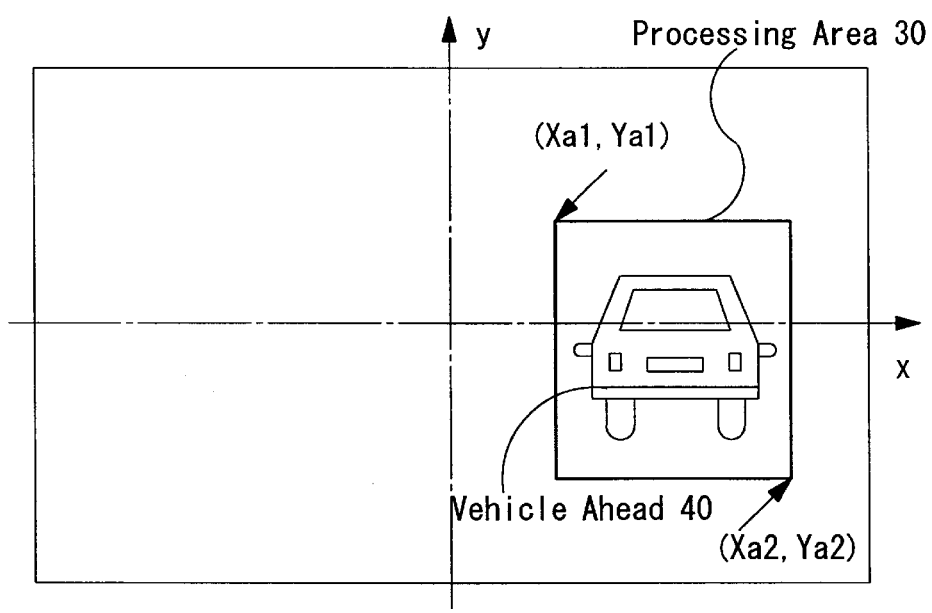
FIG. 3 is a diagram showing the processing area in accordance with one embodiment of the present invention.

The process of setting the processing area is described below by referring to FIGS. 3 and 4. FIG. 3 shows an example of the captured image in which the vehicle ahead 40 running forward is included. As shown in FIG. 3, an x-axis and a y-axis are fixed in the image, and a processing area 30 is defined by the coordinates (Xa1, Ya1) and (Xa2, Ya2).

Figure 4:
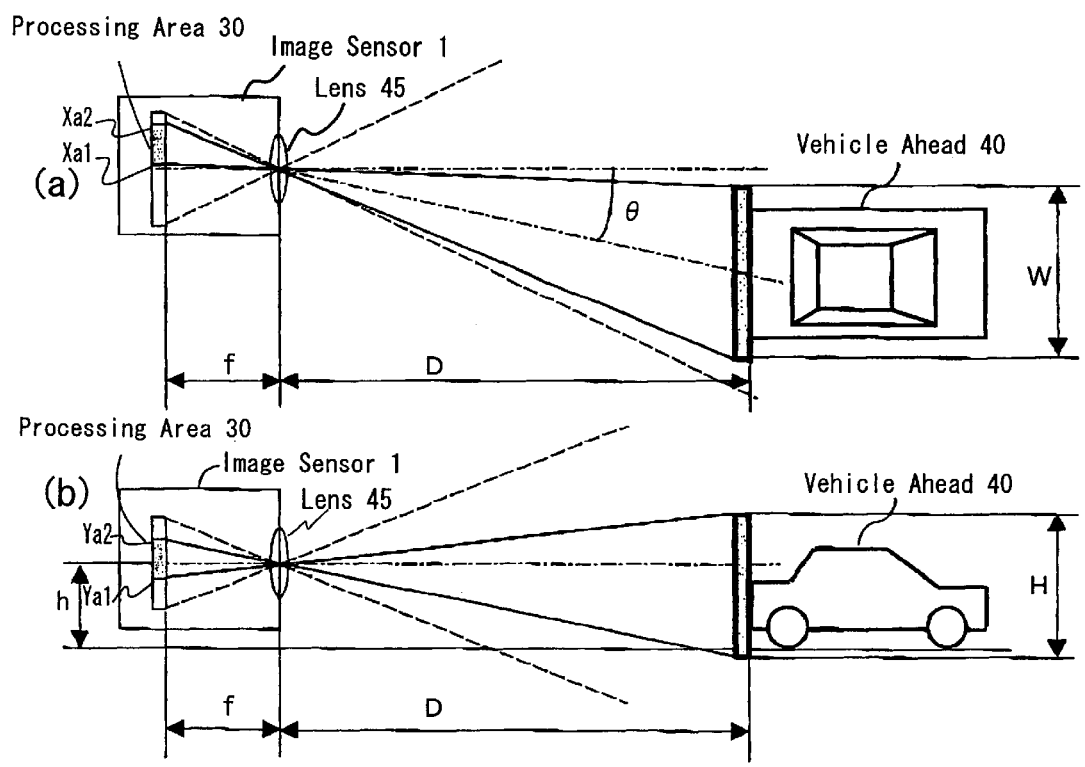
FIG. 4 is a diagram showing the scheme for setting a processing area in accordance with one embodiment of the present invention.

FIG. 4 shows the way for setting the processing area 30. FIG. 4(A) shows the way for determining the x coordinates, that is, Xa1 and Xa2, and FIG. 4(B) shows the way to determine the y coordinates, that is, Ya1 and Ya2.

In FIG. 4, the image sensor 1 is mounted on the vehicle mounting the system of the invention. The image sensor 1 captures the vehicle ahead 40 that is traveling in front of the vehicle mounting the system of the invention. Reference character f denotes the focal length of the lens 45 mounted on the image sensor 1, which is specified depending on the characteristic of the lens. Reference characters W and H denote predetermined width and height of the object to be recognized, that is, the vehicle ahead in the present embodiment, respectively. The width and height are preset to surround the object to be recognized. For example, for the vehicle ahead, W may be set to 2 m, and H may be set to 2.5 m. Reference characters D and θ denote the distance to the vehicle ahead and the relative direction of the vehicle ahead stored in the object position memory 4 respectively. Reference character h denotes the height from the road to the center of the lens 45, which is predefined depending on the position of the image sensor 1 in the vehicle mounting the system of the invention. The processing area setting part 5 extracts D and stored in the object position memory 4 to compute the coordinates (Xa1, Ya1) and (Xa2, Ya2) using the predetermined parameters W, H, and h as follows.

$$Xa1 = (D \times \tan\theta - (W/2)) \times (f/D) \quad (1)$$

$$Xa2 = (D \times \tan\theta + (W/2)) \times (f/D) \quad (2)$$

$$Ya1 = (H-h) \times (f/D) \quad (3)$$

$$Ya2 = (h \times (f/D)) \quad (4)$$

In one embodiment, for Ya1 and Ya2, a pitching allowance value "α" is used in consideration of pitching of the vehicle mounting the system of the invention.

$$Ya1 = (H-h) \times (f/D) + \alpha \quad (5)$$

$$Ya2 = (h \times (f/D) + \alpha) \quad (6)$$

Figure 5:
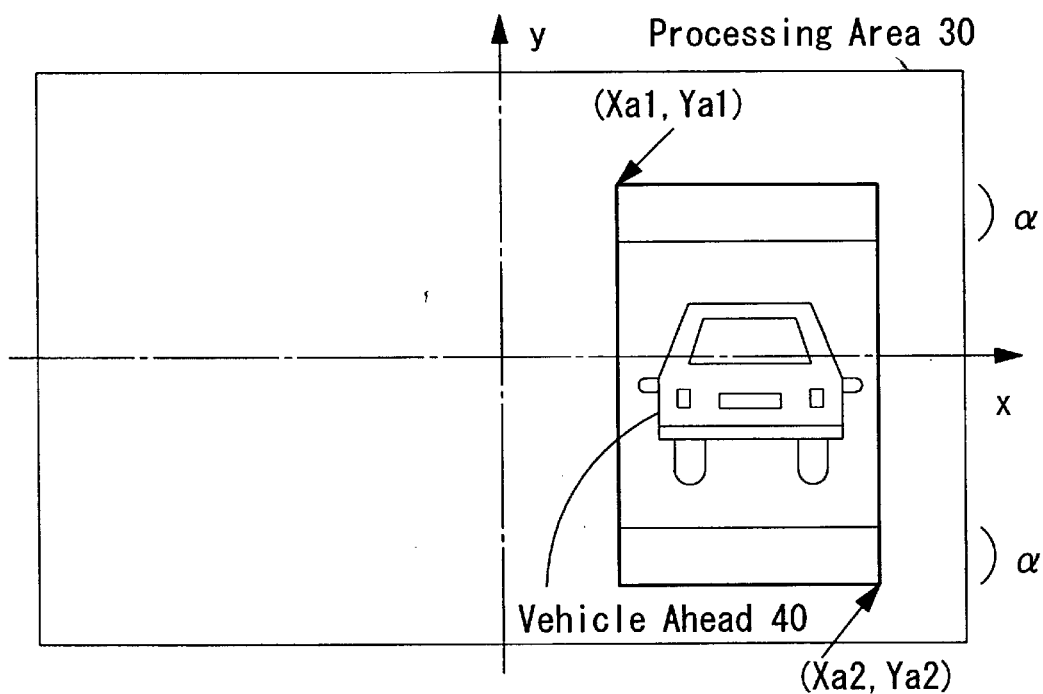
FIG. 5 is a diagram showing another processing area with allowance for pitching in accordance with one embodiment of the present invention.

Thus, the processing area 30 is defined within the captured image by the coordinates (Xa1, Ya1) and (Xa2, Ya2) as shown in FIG. 3, or is defined as shown in FIG. 5 with the pitching taken into account.

Extracting Horizontal and Vertical Edges

Figure 6:
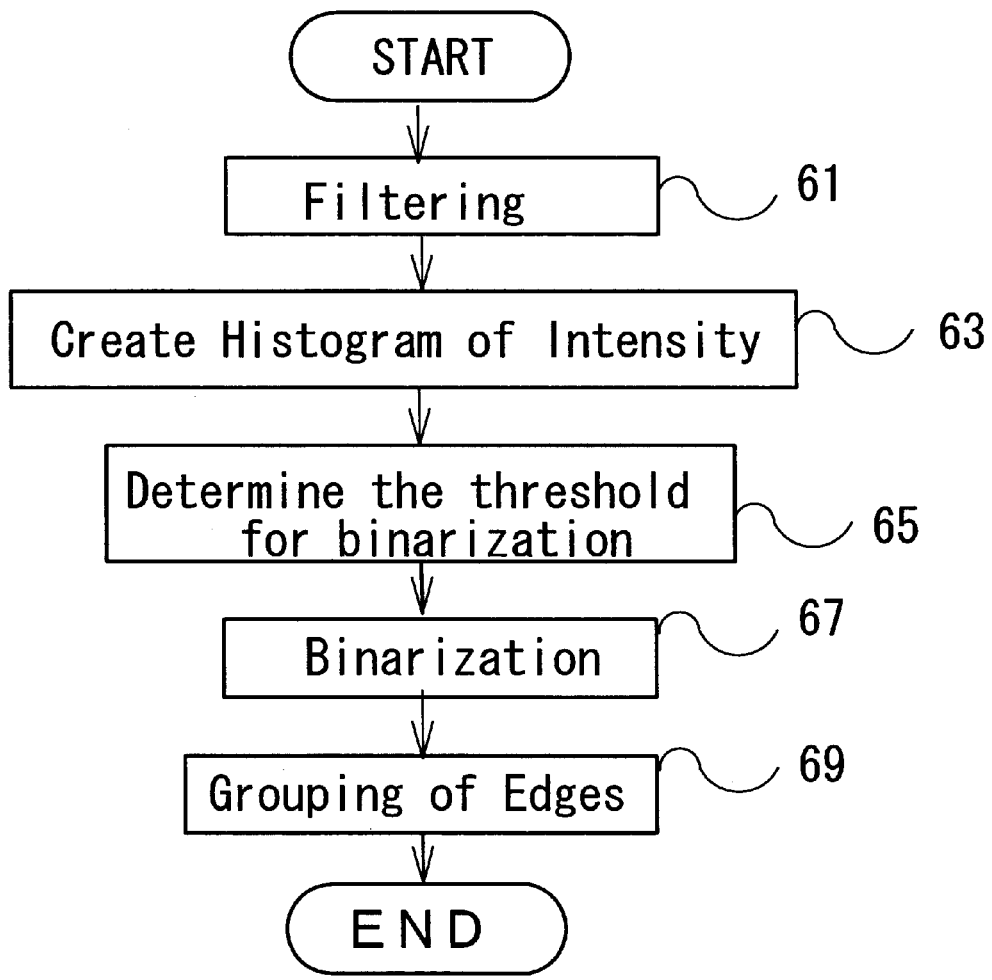
FIG. 6 is a flowchart of the method for extracting edges.

A horizontal edge extraction part 7 and a vertical edge extraction part 9 shown in FIG. 1 extract horizontal edges and vertical edges respectively from the processing area 30. Since both horizontal and vertical edges are extracted in the same way, only the process of extracting horizontal edges is described below. The extracted edges show a portion in which the variation of intensity is large in the image. FIG. 6 is a flowchart of extracting edges, which is implemented by the horizontal edge extraction part 7.

First, the horizontal edge extraction part 7 performs filtering process on each pixel within the processing area 30 in the horizontal direction to enhance edge portions indicating a large difference in intensity in the horizontal direction (step 61). FIG. 7(A) shows an example of a horizontal edge filter. For convenience in the following computation, coordinates are assigned to each element of the filter as shown in FIG. 7(B).

A computation shown in the equation (7) is executed for the intensity value of each pixel within the processing area 30 while the processing area 30 is scanned by the horizontal edge filter.

$$P(x, y) = \sum_{i=-1}^{1} \sum_{j=-1}^{1} \{F(i, j) \times G(x+i, y+j)\} \quad (7)$$

In equation (7), x and y are coordinates identifying the position of each of pixels in the processing area 30. G(x, y) indicates the intensity value of the pixel at (x, y), and F(i, j) indicates the value of the filter element at (i, j) of the horizontal edge filter. P(x, y) indicates the intensity value of the pixel at (x, y) after the filtering process has been performed. Since values of elements of the horizontal edge filter are predetermined such that horizontal edges are enhanced, horizontal edges can be detected by performing the above computation on each pixel.

In another embodiment, instead of the equation (7), the filtering process is carried out by differentiation. In this case, the difference in intensity between vertically adjacent pixels is calculated as shown in equation (8), where n is an integer, for example, may be set to 1 (n=1).

$$P(x, y) = G(x, y-n) - G(x, y+n) \quad (8)$$

Figure 8:
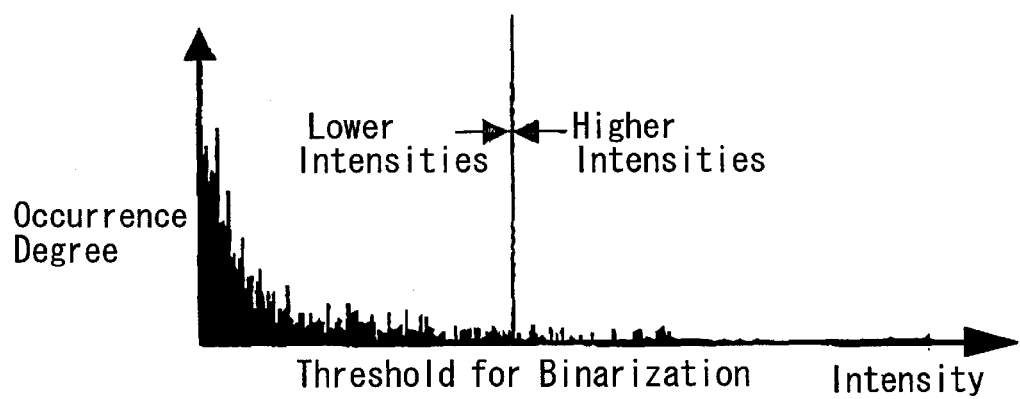
FIG. 8 is a histogram showing intensity values of the captured image.

Then, an intensity histogram is created based on the intensity value P of each pixel (step 63). The intensity value used in this embodiment is represented as digital data having 256 gradations (ranging from pure black "0" to pure white "255") FIG. 8 shows an example of the intensity histogram. The horizontal axis indicates the intensity values obtained by the filtering process while the vertical axis indicates the number of pixels corresponding to each of the intensity values.

On the basis of the histogram, the intensity value at which the ratio between the number of pixels in lower intensities and the number of pixels in higher intensities matches a predetermined value is determined as a threshold for binarization (step 65). Alternatively, the ratio between the number of the pixels forming edges of the vehicle ahead and the number of pixels of the processing area 30 may be estimated before hand, and the intensity value that corresponds to the estimated ratio and that is greater than a predetermined intensity value may be determined as the threshold for binarization.

With respect to the threshold, for example, the higher intensities are assigned 1, the lower intensities are assigned 0, thereby producing a binary image of the processing area 30 (step 67). The pixel having the value of 1 may be referred to as an edge point.

There are a number of conventional methods for setting the threshold for binarization. The above method for setting the threshold is merely an example and is not meant to exclude another method.

Then, pixels having the value of 1, that is, edge points, are extracted. If two or more edge points continue, they are grouped into a horizontal edge. In the present embodiment, a labeling process using a template is used as a method for grouping edge points. The labeling process is described in detail in U.S. patent application Ser. No. 09/567,734 which is incorporated herein by reference.

With reference to FIG. 9, the labeling process is described below. FIG. 9 shows a template for the labeling process. T1 through T3 in FIG. 9(A) indicate positions in the template. V1 through V3 in FIG. 9(B) indicate the values (1 or 0) of pixels corresponding to the positions T1 through T3 respectively when the template is positioned such that T2 assumes the place of an edge point to be processed. L1 through L3 in FIG. 9(C) indicate labels assigned to pixels corresponding to the positions T1 through T3 respectively.

The table in FIG. 9(D) shows the type of label L2 that is assigned to the edge point at position T2 based on the value of the pixels at positions T1 through T3 when T2 is placed at the edge point to be processed. For example, if the values V1 through V3 at positions T1 through T3 satisfy condition 4 in FIG. 9(D), then a label L1 is assigned to the edge point at T2. The label L is assigned when the condition 1 is satisfied requiring a new label. A horizontal edge extraction part 7 successively scans the edge points placing T2 of the template at respective edge points, thus assigning label L2 to respective edge points, as shown in FIG. 9(E).

The process of assigning labels to respective edge points is described more specifically with reference to FIG. 10. FIG. 10(A) is an example of a part of the image after binarization, wherein the value of 0 is represented by a dot. The template is placed such that position T2 of the template is at respective edge points, which have the value of 1, to be processed. FIG. 10(B) shows the image after assigning labels to edge points. As seen in FIG. 10(B), the same labels are assigned to the continuous edge points.

Here, referring to FIG. 9(D) again, when condition 5 is satisfied, labels corresponding to positions T1 and T3 are connected or joined together, and the label corresponding to T3 is replaced with the label corresponding to T1. In the example shown in FIG. 10(B), edge points 91 and 92, and edge points 92 and 93 satisfy condition 5. Therefore, all edge points having the labels D and E are re-assigned label C (see FIG. 10(C)). By connecting labels, all continuous edge points are integrated into an edge group assigned the same labels. FIG. 10(C) shows three edge groups with labels A, B and C. Thus, three horizontal edges are extracted.

In another embodiment, this process of connecting labels may be performed after scanning all edge points in the processing area 30 and assigning labels to them.

The vertical edge extraction part 9 extracts vertical edges from the processing area 30 in the same way as the horizontal edge extraction part 7 except that a vertical edge filter shown in FIG. 11 is used in step 61 (FIG. 6).

Judging Horizontal and Vertical Edges

Referring to FIG. 1, a horizontal edge judgment part 11 judges whether or not each of horizontal edges extracted by the horizontal edge extraction part 7 indicates or belongs to the object based on characteristics of the object to be recognized. In other words, each of the extracted edges is judged based on characteristics of the object when it is displayed in the image. In the present embodiment, since the object to be recognized is the vehicle ahead, the judgment is carried out based on characteristics, such as having a box-shape, having relatively a large number of horizontal edges, and having linear edges.

By way of example, the following judgment conditions are used to judge whether or not each of the extracted horizontal edges belongs to the vehicle ahead.
1) It is judged that an edge containing a pixel located on a boundary of the processing area belongs to an object other than the vehicle ahead. This is because the processing area is set to surround the vehicle ahead as described above.
2) The linearity of each of the extracted horizontal edges is examined, and it is judged that an edge having a poor linearity belongs to an object other than the vehicle ahead. This is because a horizontal edge belonging to the vehicle ahead does not draw a curve in the horizontal direction.
3) The slope of each of the extracted horizontal edges is examined, and it is judged that an edge having a large slope belongs to an object other than the vehicle ahead. This is because a horizontal edge belonging to the vehicle ahead does not have a large slope in the horizontal direction.

Figure 12:
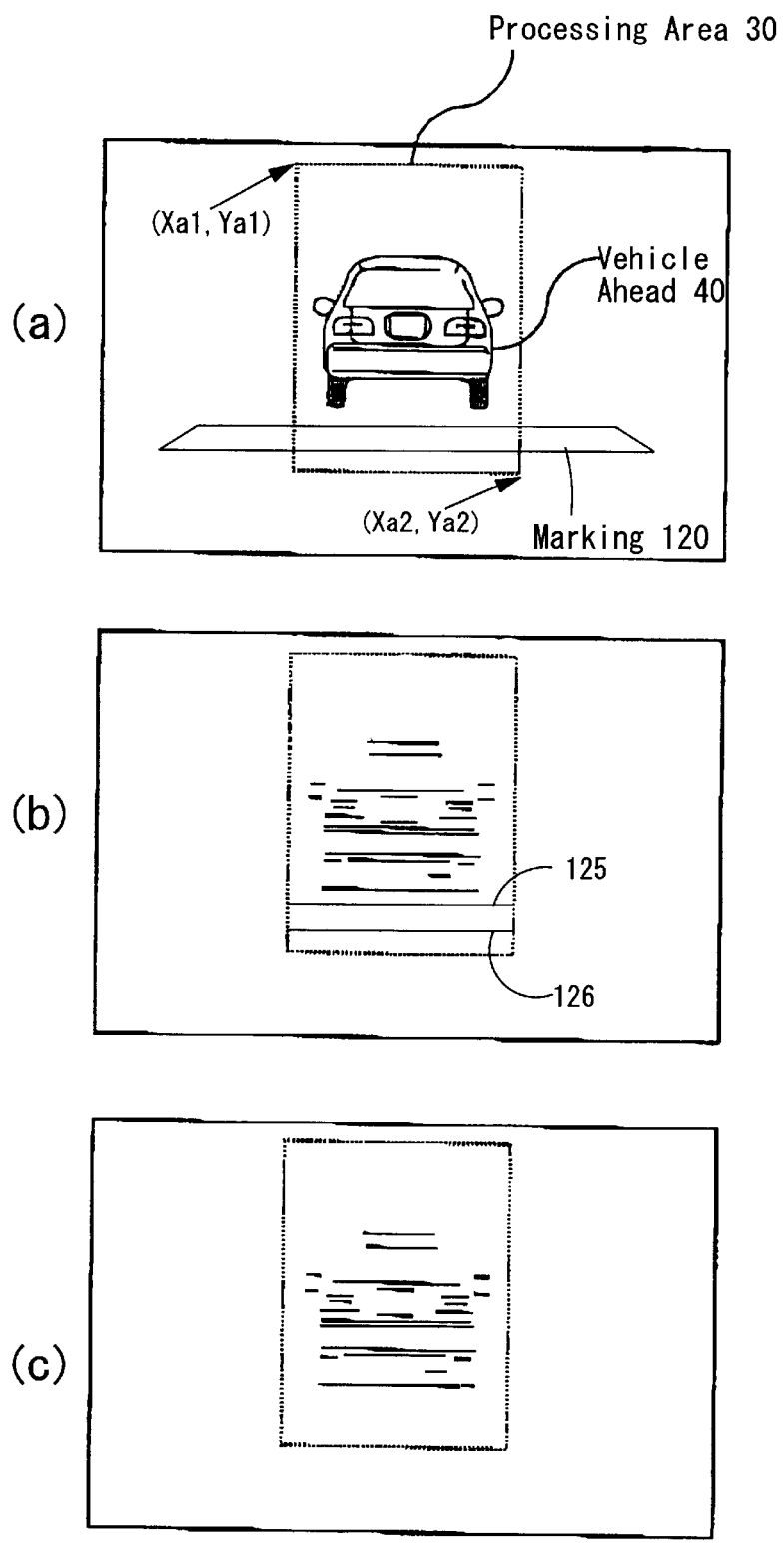
FIG. 12 is a diagram showing the scheme for determining horizontal edges in accordance with one embodiment of the invention, and also illustrating one example of the horizontal edges containing a pixel on a boundary of the processing area.

With reference to FIGS. 12, 13, and 14, the above condition 1) through 3) will be described in detail below. FIG. 12(A) shows an example of the captured image in which a marking on the road 120 is included that extends across the processing area 30. FIG. 12(B) shows a binary image of horizontal edges extracted for the image in FIG. 12(A). In this binary image, not only the edges belonging to the vehicle ahead 40, but also edges 125 and 126 belonging to the marking 120 are included. For the above condition 1), the horizontal edge judgment part 11 examines x coordinates of the pixels forming each of the horizontal edges to judge whether the x coordinates include edge points having Xa1 or Xa2. The processing area 30 is specified by the coordinates (Xa1, Ya1) and (Xa2, Ya2) as described above. Therefore, if the x coordinates include the edge points having Xa1 or Xa2, then it is judged that the horizontal edge extends across a boundary of the processing area 30, and that the horizontal edge belongs to an object other than the vehicle ahead. In the example shown in 12(B), since the edge 125 and 126 contain pixels having the x coordinates Xa1 and Xa2, each of the edges 125 and 126 is judged to belong to an object other than the vehicle ahead.

Horizontal edges judged to belong to the vehicle ahead and horizontal edges judged to belong to an object other than the vehicle ahead are stored separately in a horizontal edge memory 12. For example, the edge points forming the horizontal edges judged to belong to the vehicle ahead are stored with value 1, and the edge points forming the horizontal edge judged to belong to an object other than the vehicle ahead are stored with value zero. Alternatively, a flag may be set only for the edge points forming the horizontal edges judged to belong to an object other than the vehicle ahead, and these edge points are stored with the flag so that the edges cannot be used in subsequent processes. FIG. 12(C) shows a binary image of horizontal edges after removing the edges 125 and 126 which are judged to belong to an object other than the vehicle ahead. Horizontal edges containing a pixel on a boundary of the processing area may originate from a building in the background and a marking on the road such as a stop line.

FIG. 13(A) shows an example of the captured image in which a mountain ridge 130 is included. FIG. 13(B) shows a binary image of horizontal edges extracted for the image in FIG. 13(A). In this binary image, not only the edges belonging to the vehicle ahead 40, but also edges 135 through 137 belonging to a part of the mountain ridge 130 are included. For the above condition 2), the horizontal edge judgment part 11 calculates a variance of y coordinates of the edge points forming each of the extracted horizontal edges. If the variance is larger than a predetermined value, then the horizontal edge is judged to belong to an object other than the vehicle ahead. In the example shown in FIG. 13(B), each of the edges 135 through 137 having poor linearity is judged to belong to an object other than the vehicle ahead. Horizontal edges judged to belong to the vehicle ahead and horizontal edges judged to belong to an object other than the vehicle ahead are stored separately in the horizontal edge memory 12. FIG. 13(C) shows a binary image of horizontal edges after removing the edges 135 through 137 which are judged to belong to an object other than the vehicle ahead. Horizontal edges having a poor linearity may originate from natural objects such as a tree, and a flag used as a signboard of a shop.

FIG. 14(A) shows an example of the captured image in which white lines 140 are included. FIG. 14(B) shows a binary image of horizontal edges extracted for the image in FIG. 14(A). In this binary image, not only the edges belonging to the vehicle ahead 40, but also edges 145 and 146 belonging to the white lines 140 are included. For the above condition 3), the horizontal edge judgment part 11 approximates each of the extracted horizontal edges by straight lines in accordance with a conventional manner such as the least-squares method, to examine the slope of the edge approximated by the straight lines. If the slope is larger than a predetermined value, the horizontal edge is judged to belong to an object other than the vehicle ahead. In the example in FIG. 14(B), each of the edges 145 and 146 having a large slope is judged to belong to an object other than the vehicle ahead. Horizontal edges judged to belong to the vehicle ahead and horizontal edges judged to belong to an object other than the vehicle ahead are stored separately in the horizontal edge memory 12. FIG. 14(C) shows a binary image of horizontal edges after removing the edges 145 and 146 which are judged to belong to an object other than the vehicle ahead respectively. Horizontal edges having a large slope may originate from a guardrail, a sign of no-passing lane, and a roadside structure.

Thus, according to the above process, erroneous recognition of the vehicle ahead can be avoided by judging horizontal edges based on the characteristics of the vehicle ahead.

One or more of the judgment conditions of 1) through 3) can be used. Furthermore, another judgment condition can be used. The characteristics can be changed depending on the type of an object to be recognized, such as the size, shape, and outline of the object.

A vertical edge judgment part 13 judges whether or not each of extracted vertical edges belongs to the vehicle ahead by the same way as the horizontal edge. Vertical edges judged to belong to the vehicle ahead and vertical edges judged to belong to an object other than the vehicle ahead are stored separately in a vertical edge memory 14.

Recognizing the Outline of the Object

Referring to FIG. 1 again, an object outline recognition part 15 recognizes the outline of the object based on the edges judged to belong to the object and stored in the horizontal edge memory 12 and the vertical edge memory 14. According to the present embodiment, since the object to be recognized is the vehicle ahead, the object is displayed as a box-shape. Therefore, the outline of the object is recognized by determining the positions of the upper, lower, left, and right ends of the object. The process of recognizing the outline of the object will be described with reference to FIGS. 15 through 17.

Figure 15:
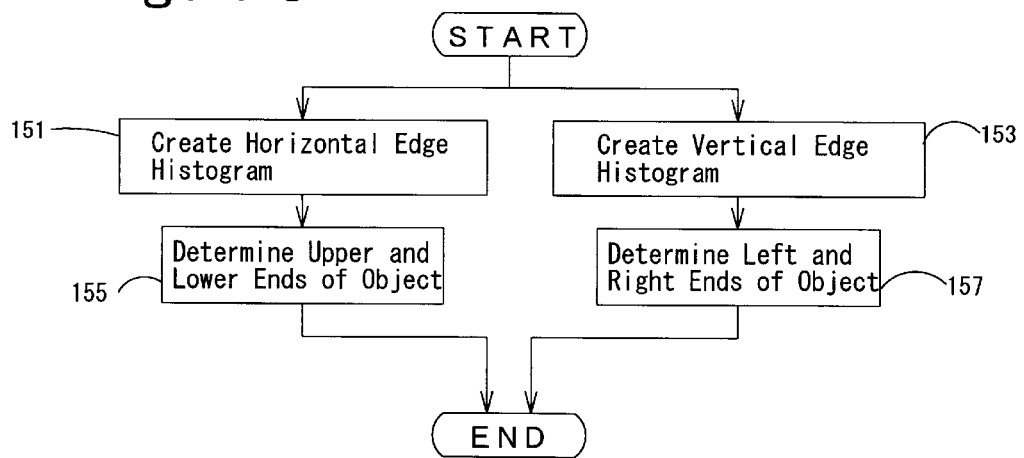
FIG. 15 is a flowchart of a method for recognizing the outline of an object in accordance with one embodiment of the invention.
Figure 16:
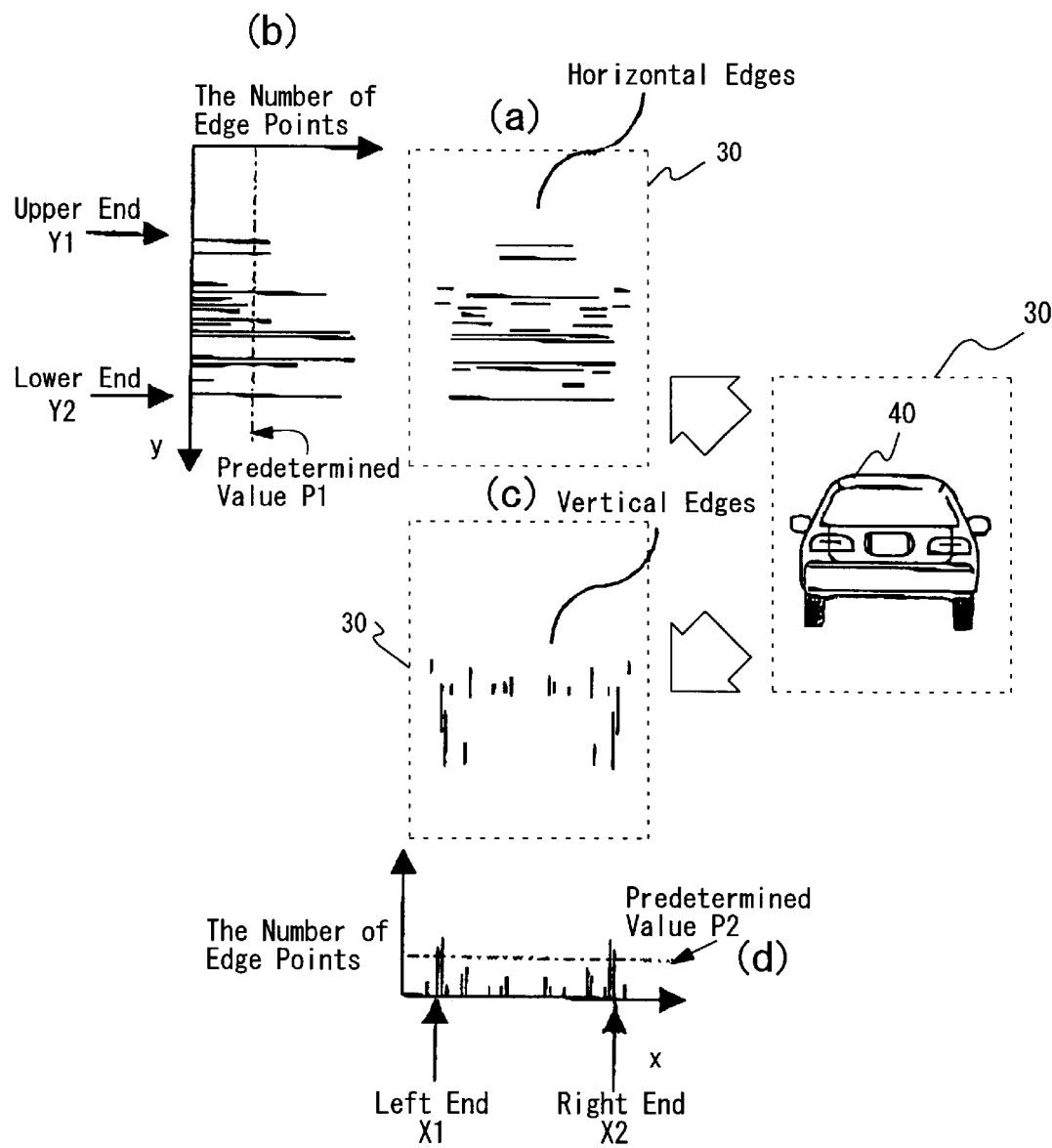
FIG. 16 is a diagram showing the scheme for recognizing upper, lower, left, and right ends of the object in accordance with one embodiment of the present invention.

FIG. 15 shows a flowchart of recognizing the outline of the object. First, the object outline recognition part 15 creates a histogram of the horizontal edges judged to belong to the vehicle ahead by the horizontal edge judgment part 11. The object outline recognition part 15 also creates a histogram of the vertical edges judged to belong to the vehicle ahead by the vertical edge judgment part 13 (steps 151 and 153).

With reference to FIG. 16(A), the binary image shows the horizontal edges judged to belong to the vehicle ahead. FIG. 16(B) is a histogram corresponding to FIG. 16(A), and shows the number of the edge points forming the horizontal edge at each y coordinate in the processing area 30. On the other hand, FIG. 16(C) shows a binary image showing the vertical edges judged to belong to the vehicle ahead. FIG. 16(D) is a histogram corresponding to FIG. 16(C), and shows the number of the edge points forming the vertical edge at each x coordinate in the processing area 30.

Figure 17:
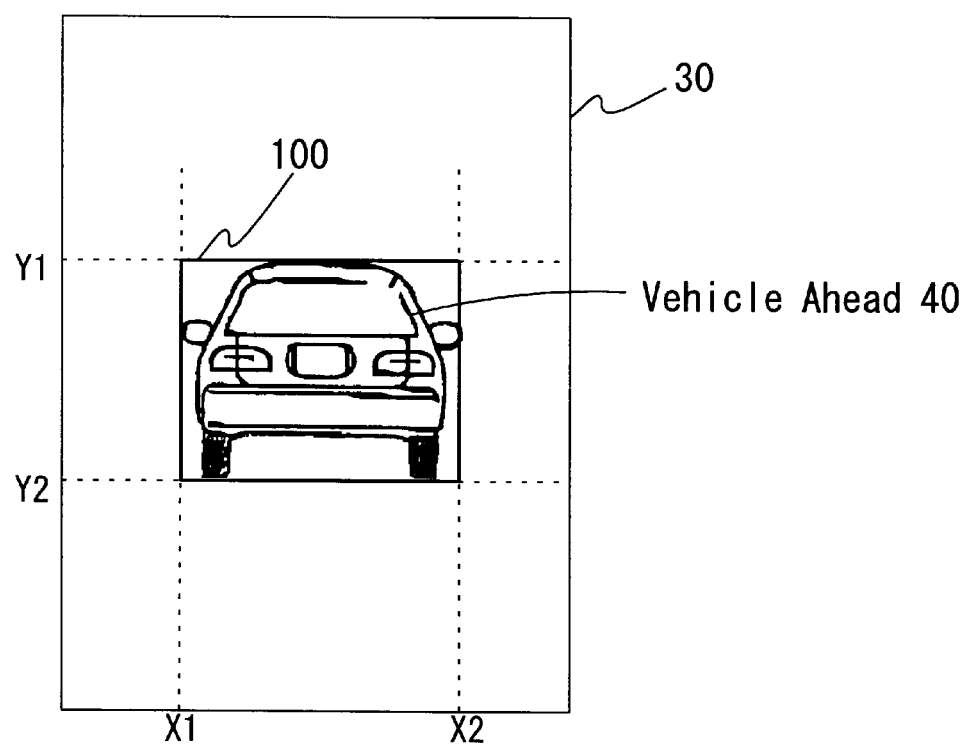
FIG. 17 is a diagram showing the object whose outline is recognized in accordance with one embodiment of the present invention.

The object outline recognition part 15 determines the positions of the upper and lower ends of the vehicle ahead based on the horizontal edge histogram in FIG. 16(B) (step 155), and determines the positions of the left and right ends of the vehicle ahead based on the vertical edge histogram in FIG. 16(D) (step 157). More specifically, an upper and a lower horizontal edges are identified from the histogram in FIG. 16(B). The upper horizontal edge is the horizontal edge in which the number of edge points included is larger than a predetermined value P1, and which is closest to the upper boundary Ya1 of the processing area 30. The lower horizontal edge is the horizontal edge in which the number of edge points included is larger than the predetermined value P1, and which is closest to the lower boundary Ya2 of the processing area 30. The y coordinate Y1 corresponding to the upper horizontal edge is determined as the upper end of the vehicle ahead while the y coordinate Y2 corresponding to the lower horizontal edge is determined as the lower end. In addition, a left and a right vertical edges are also identified from the histogram in FIG. 16(D). The left vertical edge is the vertical edge which is located near the left boundary Xa1 of the processing area 30, and in which the number of edge points included is larger than a predetermined value P2. The right vertical edge is the vertical edge which is located near the right boundary Xa2 of the processing area 30, and in which the number of edge points included is larger than the predetermined value P2. The x coordinates X1 corresponding to the left vertical edge is determined as the left end of the vehicle ahead while the x coordinates X2 corresponding to the right vertical edge is determined as the right end. Thus, as shown in FIG. 17, the positions of the upper, lower, left, and right ends of the vehicle ahead 40 are determined, thereby recognizing the outline 100 of the vehicle ahead 40.

In another embodiment, only horizontal edges may be extracted from the processing area to judge whether each of the extracted horizontal edges belongs to the object, determining the positions of the upper, lower, left and right ends of the object based on the horizontal edges judged to belong to the object. In this case, the longest horizontal edge between the upper and lower ends may be selected, and then the x coordinates corresponding to the left and right ends of the longest horizontal edge may be determined as the positions of the left and right ends of the object respectively. When the object is the vehicle ahead, a comparatively large number of horizontal edges can be extracted. Therefore, the outline of the vehicle ahead can be recognized based on the horizontal edges only.

Referring to FIG. 1 again, an object data output part 17 receives the outline data about the vehicle ahead recognized by the object outline recognition part 15, the outline data including the positions of the upper, lower, left and right ends of the vehicle ahead, and outputs it to a vehicle controller 19.

The vehicle controller 19 controls the operation of the vehicle mounting the system of the invention according to the outline data. For example, it may control the vehicle such that an appropriate distance is kept from the vehicle ahead. The controller 19 may alert a driver with a voice message, warning lights, or a warning beep. The controller may also control the engine of the vehicle to forcibly decelerate the vehicle when the distance to the vehicle ahead is shorter than a predetermined value.

FIG. 18 shows another embodiment of the object recognition system of the present invention. The reference numbers also shown in FIG. 1 refer to the same components. According to this embodiment, the horizontal edge extraction part 7 extracts horizontal edges. The horizontal edge judgment part 11 judges whether each of the extracted horizontal edges belongs to an object, and then determines the upper and lower ends of the object based on the horizontal edges judged to belong to the object. A vertical direction processing area reduction part 6 reduces the processing area set by the processing area setting part 5 in the vertical direction to a smaller area whose upper and lower ends respectively correspond to the upper and lower ends determined by the horizontal edge judgment part 11. The vertical edge extraction part 9 extracts vertical edges from the reduced processing area, and the vertical edge judgment part 13 judges whether each of the extracted vertical edges belongs to the object. Since vertical edges are extracted and judged for the smaller area, the performance of the object recognizing process is improved. In this embodiment, extracting and judging edges, and determining the upper, lower, left, and right ends of the object are performed in the same way as described above.

Each of the processing area setting part 5, the horizontal edge extraction part 7, the vertical edge extraction part 9, the horizontal edge judgment part 11, the vertical edge judgment part 13, the horizontal edge memory 12, the vertical edge memory 14, the object outline recognition part 15, the object data output part 17, and the vehicle controller 19 shown in FIG. 1 can be implemented by a micro-controller which typically includes a central processing part (CPU), a read-only memory storing control programs and data, and a random-access memory (RAM) providing an working area for the CPU and temporary storage for various data. In other words, computer programs stored in the ROM implements the above-described functions of the functional blocks shown in FIG. 1.

The image memory 2, the object position memory 4, the horizontal edge memory 12, and the vertical edge memory 14 may be implemented using different memory areas of a single RAM. Temporary storage areas for data required in various types of operations may also be provided by portions of the same RAM.

The object recognition system according to the present invention may be LAN-connected to an engine electronic control part (ECU), brake-control part and other ECU, and the output from this object recognition system may be used for overall control of the vehicle.

Thus, according to the invention, the outline of an object is recognized by judging whether each of edges contained in the processing area indicates or belongs to the object based on the characteristics of the object to be recognized. Therefore, the outline of the object can be more correctly recognized.

Although particular embodiments of the invention have been described in detail, it should be appreciated that the alternatives specifically mentioned above and many other modifications, variations, and adaptations may be made without departing from the scope of the invention as defined in the claims.

What is claimed is:

1. An object recognition system, comprising:
   a position sensor for determining a position of an object;
   an image sensor for capturing an image of the object; and
   a controller programmed to:
   set a processing area within the image captured by the image sensor based on the position of the object determined by the position sensor and a predetermined size for the object to be recognized, to extract edges from the processing area, and to judge whether each of the extracted edges belongs to the object based on characteristics of the object to be recognized; and
   to examine a slope of each of the extracted edges;
   wherein said controller recognizes an outline of the object according to the edges judged to belong to the object; and wherein an edge is judged to belong to an object other than the object to be recognized if the edge has a large slope.

2. The system of claim 1, wherein the edges include horizontal edges and vertical edges.

3. The system of claim 2, wherein said controller is further programmed to determine upper and lower ends of the object from the horizontal edges, and to determine left and right ends of the object from the vertical edges; and
   wherein the outline of the object is recognized by the determined upper, lower, left, and right ends.

4. The system of claim 3, wherein said controller is further programmed to identify an upper horizontal edge whose length is larger than a first predetermined value and which is closest to an upper boundary of the processing area, and to identify a lower horizontal edge whose length is larger than the first predetermined value and which is closest to a lower boundary of the processing area;
   wherein said controller is further programmed to identify a left vertical edge whose length is larger than a second predetermined value and which is located near a left boundary of the processing area, and to identify a right vertical edge whose length is larger than the second predetermined value and which is located near a right boundary of the processing area;
   wherein the upper end of the object is determined by the position in the vertical direction that corresponds to the identified upper horizontal edge, and the lower end of the object is determined by the position in vertical direction that corresponds to the identified lower horizontal edge; and
   wherein the left end of the object is determined by the position in the horizontal direction that corresponds to the identified left vertical edge, and the right end of the object is determined by the position in the horizontal direction that corresponds to the identified right vertical edge.

5. The system of claim 3, wherein the controller is further programmed to reduce the processing area in the vertical direction to the area defined by the determined upper and lower ends; and
   wherein the vertical edges are extracted from the reduced process area.

6. The system of claim 1, wherein the predetermined size is defined to surround the object to be recognized.

7. An object recognition system, comprising:
   a position sensor for determining a position of an object;
   an image sensor for capturing an image of the object;
   a controller programmed to:
   set a processing area within the image captured by the image sensor based on the position of the object determined by the position sensor and a predetermined size for the object to be recognized, to extract edges from the processing area, and to judge whether each of the extracted edges belongs to the object based on characteristics of the object to be recognized; and
   check if each of the extracted edges contains a pixel located on a boundary of the processing area;
   wherein said controller recognizes an outline of the object according to the edges judged to belong to the object; and
   wherein an edge is judged to belong to an object other than the object if the edge contains pixels located on a boundary of the processing area.

8. The system of claim 7, wherein the edges include horizontal edges and vertical edges.

9. The system of claim 8, wherein said controller is further programmed to determine upper and lower ends of the object from the horizontal edges, and to determine left and right ends of the object from the vertical edges; and
   wherein the outline of the object is recognized by the determined upper, lower, left, and right ends.

10. The system of claim 9, wherein said controller is further programmed to identify an upper horizontal edge whose length is larger than a first predetermined value and which is closest to an upper boundary of the processing area, and to identify a lower horizontal edge whose length is larger than the first predetermined value and which is closest to a lower boundary of the processing area;
    wherein said controller is further programmed to identify a left vertical edge whose length is larger than a second predetermined value and which is located near a left boundary of the processing area, and to identify a right vertical edge whose length is larger than the second predetermined value and which is located near a right boundary of the processing area;
    wherein the upper end of the object is determined by the position in the vertical direction that corresponds to the identified upper horizontal edge, and the lower end of the object is determined by the position in vertical direction that corresponds to the identified lower horizontal edge; and wherein the left end of the object is determined by the position in the horizontal direction that corresponds to the identified left vertical edge, and the right end of the object is determined by the position in the horizontal direction that corresponds to the identified right vertical edge.

11. The system of claim 9, wherein the controller is further programmed to reduce the processing area in the vertical direction to the area defined by the determined upper and lower ends; and wherein the vertical edges are extracted from the reduced process area.

12. The system of claim 7, wherein the predetermined size is defined to surround the object to be recognized.

13. An object recognition system, comprising:

a position sensor for determining a position of an object;

an image sensor for capturing an image of the object; and a controller programmed to:

set a processing area within the image captured by the image sensor based on the position of the object determined by the position sensor and a predetermined size for the object to be recognized, to extract edges from the processing area, and to judge whether each of the extracted edges belongs to the object based on characteristics of the object to be recognized; and examine a linearity of each of the extracted edges;

wherein said controller recognizes an outline of the object according to the edges judged to belong to the object; and wherein an edge is judged to belong to an object other than the object to be recognized if the edge has a poor linearity.

14. The system of claim 13, wherein the edges include horizontal edges and vertical edges.

15. The system of claim 14, wherein said controller is further programmed to determine upper and lower ends of the object from the horizontal edges, and to determine left and right ends of the object from the vertical edges; and wherein the outline of the object is recognized by the determined upper, lower, left, and right ends.

16. The system of claim 15, wherein said controller is further programmed to identify an upper horizontal edge whose length is larger than a first predetermined value and which is closest to an upper boundary of the processing area, and to identify a lower horizontal edge whose length is larger than the first predetermined value and which is closest to a lower boundary of the processing area;

wherein said controller is further programmed to identify a left vertical edge whose length is larger than a second predetermined value and which is located near a left boundary of the processing area, and to identify a right vertical edge whose length is larger than the second predetermined value and which is located near a right boundary of the processing area;

wherein the upper end of the object is determined by the position in the vertical direction that corresponds to the identified upper horizontal edge, and the lower end of the object is determined by the position in vertical direction that corresponds to the identified lower horizontal edge; and wherein the left end of the object is determined by the position in the horizontal direction that corresponds to the identified left vertical edge, and the right end of the object is determined by the position in the horizontal direction that corresponds to the identified right vertical edge.

17. The system of claim 15, wherein the controller is further programmed to reduce the processing area in the vertical direction to the area defined by the determined upper and lower ends; and wherein the vertical edges are extracted from the reduced process area.

18. The system of claim 13, wherein the predetermined size is defined to surround the object to be recognized.

19. A method for recognizing an object comprising the steps of:

a) determining a position of the object;

b) capturing an image of the object;

c) setting a processing area within the image based on the determined position of the object and a predetermined size for the object to be recognized;

d) extracting edges from the processing area;

e) judging whether each of the extracted edges belongs to the object based on characteristics of the object to be recognized by, i) examining a slope of each of the extracted edges; and ii) judging that an edge belongs to an object other than the object to be recognized if the edge has a slope greater than a predetermined value; and f) recognizing an outline of the object according to the edges judged to belong to the object.

20. The method of claim 19, wherein the step e) further comprises a step of approximating each of the extracted edges by straight lines; and wherein the step ii) further comprises a step of judging that an edge belongs to an object other than the object to be recognized if the slope of the edge approximated by straight lines is greater than a predetermined value.

21. A method for recognizing an object comprising the steps of:

a) determining a position of the object;

b) capturing an image of the object;

c) setting a processing area within the image based on the determined position of the object and a predetermined size for the object to be recognized;

d) extracting edges from the processing area;

e) judging whether each of the extracted edges belongs to the object based on characteristics of the object to be recognized by, i) checking if each of the extracted edges contains a pixel located on a boundary of the processing area; and ii) judging that an edge belongs to an object other than the object to be recognized if the edge contains a pixel located on a boundary of the processing area; and f) recognizing an outline of the object according to the edges judged to belong to the object.

22. A method for recognizing an object comprising the steps of:

a) determining a position of the object;

b) capturing an image of the object;

c) setting a processing area within the image based on the determined position of the object and a predetermined size for the object to be recognized;

d) extracting edges from the processing area;

e) judging whether each of the extracted edges belongs to the object based on characteristics of the object to be recognized by,
  i) examining a linearity of each of the extracted edges; and
  ii) judging that an edge belongs to an object other than the object to be recognized if the edge has a poor linearity; and
f) recognizing an outline of the object according to the edges judged to belong to the object.

23. The method of claim 22, wherein the step i) further comprises a step of calculating a variance of the positions in vertical direction of the points forming each of the extracted edges; and
wherein the step j) further comprises a step of judging that an edge belongs to an object other than the object to be recognized if the variance calculated for the edge is greater than a predetermined value.

24. An object recognition system, comprising:
a position sensor for determining a position of an object;
an image sensor for capturing an image of the object;
means for setting a processing area within the image captured by the image sensor based on the position of the object determined by the position sensor and a predetermined size for the object to be recognized;
means for extracting edges from the processing area; and
means for judging whether each of the extracted edges belongs to the object based on characteristics of the object to be recognized, said means for judging comprises,
a means for examining a slope of each of the extracted edges;
wherein an outline of the object is recognized according to the edges judged to belong to the object; and
wherein an edge is judged to belong to an object other than the object to be recognized if the edge has a large slope.

25. An object recognition system, comprising:
a position sensor for determining a position of an object;
an image sensor for capturing an image of the object;
means for setting a processing area within the image captured by the image sensor based on the position of the object determined by the position sensor and a predetermined size for the object to be recognized;
means for extracting edges from the processing area; and
means for judging whether each of the extracted edges belongs to the object based on characteristics of the object to be recognized, said means for judging comprises,
a means for checking if each of the extracted edges contains a pixel located on a boundary of the processing area;
wherein an outline of the object is recognized according to the edges judged to belong to the object;
wherein an edge is judged to belong to an object other than the object if the edge contains a pixel located on a boundary of the processing area.

26. An object recognition system, comprising:
a position sensor for determining a position of an object;
an image sensor for capturing an image of the object;
means for setting a processing area within the image captured by the image sensor based on the position of the object determined by the position sensor and a predetermined size for the object to be recognized;
means for extracting edges from the processing area; and
means for judging whether each of the extracted edges belongs to the object based on characteristics of the object to be recognized, said means for judging comprises,
a means for examining a linearity of each of the extracted edges;
wherein an outline of the object is recognized according to the edges judged to belong to the object; and
wherein an edge is judged to belong to an object other than the object to be recognized if the edge has a poor linearity.

* * * * *